(12) United States Patent
Satoh et al.

(10) Patent No.: US 7,153,484 B2
(45) Date of Patent: Dec. 26, 2006

(54) POROUS $SI_3N_4$ PRODUCING METHOD

(75) Inventors: Takeshi Satoh, Itami (JP); Jin-joo Park, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/750,870

(22) Filed: Jan. 5, 2004

(65) Prior Publication Data

US 2004/0140596 A1   Jul. 22, 2004

(30) Foreign Application Priority Data

Jan. 21, 2003  (JP) ............................. 2003-012370

(51) Int. Cl.
   *C01B 21/068*   (2006.01)
(52) U.S. Cl. ................................... 423/344
(58) Field of Classification Search ............... 423/344, 423/324, 351, 406; 502/407
   See application file for complete search history.

(56) References Cited

U.S. PATENT DOCUMENTS

| 5,047,186 | A | * | 9/1991 | Huckabee et al. ......... 264/641 |
| 5,126,294 | A | | 6/1992 | Hirosaki et al. |
| 5,213,729 | A | | 5/1993 | Edler et al. |
| 5,603,877 | A | * | 2/1997 | Kato et al. .................. 264/683 |
| 5,804,523 | A | * | 9/1998 | Oda et al. ................... 501/97.2 |
| 5,928,601 | A | | 7/1999 | Miyake et al. |
| 6,284,690 | B1 | * | 9/2001 | Nakahata et al. .......... 501/97.1 |
| 2001/0027158 | A1 | | 10/2001 | Itoh et al. |
| 2001/0036531 | A1 | | 11/2001 | Shinohara et al. |

FOREIGN PATENT DOCUMENTS

| EP | 0 653 392 A1 | 5/1995 |
| EP | 0 669 295 | 8/1995 |
| EP | 0 757 024 | 2/1997 |
| EP | 0 784 038 | 7/1997 |
| EP | 0 940 377 | 9/1999 |
| EP | 1 298 110 A1 | 4/2003 |
| EP | 1 498 400 | 1/2005 |
| JP | 11-60355 | 3/1999 |
| JP | P2001-316188 A | 11/2001 |
| JP | P2002-284586 A | 10/2002 |
| WO | WO 94/27929 | 12/1994 |

OTHER PUBLICATIONS

Chemical Abstract & Indexes, American Chemical Society. Columbus, US, XP000353888.
Kawai C, "Effect Of Grain Size Distribution On The Strength Of Porous SI3N4 Ceramics Composed Of Elongated Beta-SI3N4 Grains" Dec. 1, 2001, pp. 5713-5717, XP001107807.
Search Report dated May 19, 2006.

* cited by examiner

*Primary Examiner*—Edward M. Johnson
(74) *Attorney, Agent, or Firm*—McDermott Will & Emery LLP

(57) ABSTRACT

A producing method of a porous $Si_3N_4$ having high porosity and formed of $Si_3N_4$ particles having a high aspect ratio includes the following steps. A compound of a rare earth element as a first sintering agent is mixed in an amount of 7.5–45 parts by mass, in terms of an oxide of the element, with respect to 100 parts by mass of Si powder to obtain mixed powder. A binder is added to the mixed powder, which is then molded into a molded body. The molded body is heated in a nitrogen atmosphere to 300–500° C. to remove the binder. The binder-removed body is heated in a nitrogen atmosphere to 1350–1500° C. for nitriding. The nitrided body is then sintered at 1750–1900° C. at a nitrogen pressure of 0.1–1 atmosphere.

3 Claims, No Drawings

POROUS $Si_3N_4$ PRODUCING METHOD

BACKGROUND OF THE INVENTION

1. Field of the Invention

The present invention relates to a porous $Si_3N_4$ for separating or removing foreign matters from a liquid such as water used to polish a semiconductor, and a producing method thereof.

2. Description of the Background Art $Si_3N_4$ powder or metal silicon powder may be used as a raw material of the $Si_3N_4$ sintered body. WO 94/27929 (EP 0 653 392 A1) discloses a $Si_3N_4$ porous body with entangled prismatic β-$Si_3N_4$ particles having an aspect ratio of at least 3, which is produced by sintering α-$Si_3N_4$ powder as the raw material added with a compound of a rare earth element. This porous body is a high-porosity and high-strength porous ceramic having prosity of at least 30% and an average pore diameter in a range of 0.05–12 μm. Such characteristics are achieved by the fact that the $Si_3N_4$ crystal grain is in the form of hexagonal column.

Japanese Patent Laying-Open No. 2001-316188 (US 2001/0036531 A1) discloses an invention related to a silicon nitride porous body using metal silicon powder and silicon oxide powder as its starting materials and having a generally columnar outer shape to increase a contact area with a fluid such as a gas. This porous body is produced through the following steps. Firstly, a molding aid and water are added to a mixture of 100 parts by mass of metal silicon particles having an average particle diameter of 1–150 μm and 0.2–45 parts by mass, in terms of $SiO_2$, of silicon oxide particles, followed by kneading to obtain a kneaded product. Next, the kneaded product is extrusion molded by means of a mold to have at least two through holes parallel to each other. The obtained extrusion-molded body is heat treated in a nitrogen atmosphere in two steps, at a temperature of 1200–1400° C. in the first step, and thereafter, at a temperature of 1500–1800° C. in the second step. The porous body thus obtained has a great number of columnar crystals precipitated on the surfaces of the through holes and extending almost perpendicularly toward the inside of the through holes.

When the $Si_3N_4$ powder is used as the starting material as in WO 94/27929, however, it is not possible to obtain an inexpensive $Si_3N_4$ porous body due to the high raw material cost. In the case of Japanese Patent Laying-Open No. 2001-316188 using metal silicon and silicon dioxide as the starting materials, columnar crystals are precipitated in the sintered body. The mechanism of precipitation of the columnar crystals is considered as follows. A gas phase of silicon monoxide generated in the flow paths of the porous body is reacted with residual carbon and nitrogen to generate silicon nitride particles, which grow with the silicon nitride particles formed on the surfaces of the through holes as nuclei, and form the columnar crystals toward the inside of the through holes. According to an embodiment of Japanese Patent Laying-Open No. 2001-316188, the columnar crystals obtained are very long in a range of 0.1–0.8 mm, which are considered to be fibrous crystals. On the other hand, although not stated explicitly, it is thought that the inside of the sintered body is filled with globular crystals. In other words, since the columnar crystals do not grow inside the sintered body, the sintered body obtained by the invention of Japanese Patent Laying-Open No. 2001-316188 is considered to be low in porosity and poor in strength, and thus, it would be difficult to obtain $Si_3N_4$ having uniformly high porosity from the surface to the inside of the sintered body.

SUMMARY OF THE INVENTION

Based on the foregoing, an object of the present invention is to provide an inexpensive and high-porosity porous $Si_3N_4$ ceramic for filtering, using metal silicon for its starting material.

A porous $Si_3N_4$ of the present invention is produced through the following steps. In a mixing step, Si powder is mixed with powder of at least one kind of a compound of a rare earth element as a first sintering agent to obtain mixed powder. The powder as the first sintering agent is mixed in an amount of 7.5–45 parts by mass, in terms of an oxide of the element, with respect to 100 parts by mass of the Si powder. In an adding step, a binder is added to the mixed powder. In a molding step, the mixture of the mixed powder and the binder is molded into a molded body. In a binder-removing step, the binder is removed from the molded body to obtain a binder-removed body. In a nitriding step, the binder-removed body is heated in a nitrogen atmosphere to 1350–1500° C. for nitriding, to form a nitrided body. Lastly, in a sintering step, the nitrided body is sintered at 1750–1900° C. at a nitrogen pressure of 0.1–1 atmosphere (0.01–0.1 MPa). According to the producing method of the present invention, it is possible to produce, at a much lower cost than in the conventional case, a porous $Si_3N_4$ having porosity of 30–60%, with $Si_3N_4$ particles constituting the porous $Si_3N_4$ being columnar particles having a minor axis length of 0.2–5 μm and an aspect ratio of 2–20, which exhibits uniformly high prosity from the surface to the inside of the sintered body.

Preferably, in the mixing step of the producing method of the present invention, a second sintering agent being at least one kind of a compound selected from compounds of IIa group elements, IIIb group elements, IVb group elements and transition elements is further mixed in an amount of 0.05–5 parts by mass, in terms of an oxide of the element, with respect to 100 parts by mass of the Si powder.

Still preferably, the nitriding step of the producing method of the present invention is conducted in a nitrogen atmosphere of 3–10 atmospheres (0.3–1 MPa).

The present invention also provides a porous $Si_3N_4$ employing Si powder and powder of at least one kind of a compound of a rare earth element as a first sintering agent as its starting materials, where the first sintering agent is mixed in an amount of 7.5–45 parts by mass, in terms of an oxide of the element, with respect to 100 parts by mass of the Si powder. This porous $Si_3N_4$ of the present invention has porosity of 30–60%, and the $Si_3N_4$ particles are columnar particles having a minor axis length of 0.2–5 μm and an aspect ratio of 2–20. Preferably, the starting materials of this porous $Si_3N_4$ further include a second sintering agent being at least one kind of a compound selected from compounds of IIa group elements, IIIb group elements, IVb group elements and transition elements, which is added in an amount of 0.05–5 parts by mass, in terms of an oxide of the element, with respect to 100 parts by mass of the Si powder. The porous $Si_3N_4$ of the present invention is particularly suitable for use as a filter.

The foregoing and other objects, features, aspects and advantages of the present invention will become more apparent from the following detailed description of the present invention.

DESCRIPTION OF THE PREFERRED EMBODIMENTS

In the mixing step of the producing method of the porous $Si_3N_4$ of the present invention, the Si powder and the first sintering agent are mixed, e.g., by adding water, alcohol or another solvent and using a ball mill or an attritor. The particle diameter of the Si powder is preferably in a range of at least 0.15 μm and less than 10 μm, for the purpose of obtaining a porous body having an average pore diameter of 0.05–12 μm. As the first sintering agent, a compound of a rare earth element, specifically at least one compound of an element selected from Sc, Y, Yb and lanthanoid, is employed. Among them, a compound of Y or Yb is preferable because of their availability and their strong effects of accelerating nitriding as well as growth of the $Si_3N_4$ columnar particles.

The first sintering agent is added in an amount of 7.5–45 parts by mass, in terms of an oxide of the element, with respect to 100 parts by mass of the Si powder. If the added amount is less than 7.5 parts by mass, part of Si will remain non-nitrided in the nitriding step. If the added amount exceeds 45 parts by mass, the amount of liquid phase will increase at the time of sintering, which promotes the sintering, and thus, the obtained porous body will be low in porosity (in a range of 10–29%). The raw material cost will also increase. Within the above-described range of the added amount, the first sintering agent is preferably added in an amount of 8–35 parts by mass, in terms of the oxide, with respect to 100 parts by mass of the Si powder, for the purposes of accelerating nitriding and improving the porosity.

In the mixing step, it is preferable to further add, as the second sintering agent, at least one compound selected from compounds of IIa group elements, IIIb group elements, IVb group elements and transition elements, in an amount of 0.05–5 parts by mass in terms of an oxide of the element with respect to 100 parts by mass of the Si powder. This can decrease the temperature for sintering, and further, a porous $Si_3N_4$ having a suitably small average pore diameter can be obtained. If the second sintering agent is added less than 0.05 parts by mass, the effects of adding the second sintering agent may not be enjoyed. If it exceeds 5 parts by mass, the porosity of the obtained porous $Si_3N_4$ may be too small.

The IIa group elements include Be, Mg, Ca, Sr and others. The IIIb group elements include B, Al, Ga and others. The IVb group elements include C, Si, Ge and others, and the transition elements include Fe, Ti, Zr and others. Although the second sintering agent is not specifically restricted as long as it includes at least one compound selected from the compounds of the IIa group elements, the IIIb group elements, the IVb group elements and the transition elements, it is preferable to employ Ca, Be, Mg, Al, Ti and/or Zr as the second sintering agent for the purposes of obtaining a small average pore diameter without decreasing the porosity.

The step of adding the binder to the mixed powder (the adding step) can be regarded as a preparatory step for solidifying the powder with the binder at the time of molding. The amount and material of the binder may differ depending on a shape into which the mixed powder is to be molded in the molding step as will be described later. Examples of the binder material include polyvinyl alcohol or its degenerative(s), starch or its degenerative(s), methyl cellulose, carboxymethyl cellulose, hydroxymethyl cellulose, polyethylene glycol, polypropylene glycol, glycerin and others. For example, in the case of forming a honeycomb-shaped molded body in the molding step, methyl cellulose is preferably used as the binder, which is added 5–25 parts by mass with respect to 100 parts by mass of the mixed powder. In the case of forming a circular plate-shaped molded body in the molding step, polyvinyl alcohol is preferably used as the binder, which is added 3–15 parts by mass with respect to 100 parts by mass of the mixed powder.

The step of forming the molded body (the molding step) is for molding the mixture of the mixed powder and the binder obtained in the above-described adding step into a desired shape, to make the shape of the sintered body approximate to the shape of the final product. The purpose of the molding step is to mold the mixture into a honeycomb, circular plate, pipe, rectangular plate, or any other shape of the final product. For molding into the honeycomb shape, the binder is normally added in a relatively large amount in the adding step, and extrusion molding is conducted. For molding into the circular plate shape, the binder is added in a relatively small amount in the adding step, compared to the case of the extrusion molding, and press molding is conducted. What is important in the molding step is to produce a molded body of relatively low density. If such a low density molded body is obtained, a binder-removed body obtained in the binder-removing step as will be described later will have correspondingly low density, and as a result, a porous $Si_3N_4$ having high prosity (of 30–60%) suitable for use as a filter can be obtained.

Generally, it is preferable that the binder-removed body has relative density in a range of 40–60%. If the relative density is less than 40%, the binder-removed body may be weak in strength, leading to difficulty in handling. If the relative density exceeds 60%, however, the porosity of the sintered body will be small, in which case a ceramic of high prosity as the objective of the present invention may not be obtained. As the porosity of the binder-removed body increases, the aspect ratio of the $Si_3N_4$ particles increases theoretically, since the space available for growth of the particles widens. Here, the relative density is a value obtained by dividing total density including the pores by theoretical density. Specifically, the density that is calculated from a weight and a volume obtained by measurement of size or by oil impregnation is divided by the theoretical density that is a weighted mean of silicon nitride and the additives. In order to obtain a binder-removed body having the relative density within the suitable range as described above, the molding step may be conducted at a relatively low pressure of 2–7 MPa upon extrusion in the case of the extrusion molding, or may be conducted at a relatively low pressure of 0.5–1.5 tons/cm$^2$ upon pressing in the case of the press molding.

The binder-removing step is for removing the binder from the molded body obtained in the molding step, to obtain a binder-removed body. Since metal silicon is easy to oxidize and hard to nitride once oxidized, the binder is removed while the molded body is held in an inert atmosphere, e.g., in an argon or nitrogen atmosphere. During the binder-removing step, the molded body is normally held at a temperature in a range of 300–500° C., preferably in a range of 400–500° C. If the temperature is lower than 300° C., removal of the binder will be insufficient, and carbon residue will remain in a large amount. If the temperature exceeds 500° C., the speed of removal of the binder will be so fast that the molded body may crack.

Although the pressure to be held during the binder-removing step is not specifically restricted, a relatively low pressure is preferable, since the binder is apt to evaporate. On the other hand, since the binder is decomposed into various organic materials, in order to restrain them from depositing on the furnace wall or the like, the binder-removing step is preferably conducted at a pressure of 0.5–1.5 atmospheres, most preferably at a pressure of 1 atmosphere from a practical point of view. The period for the binder-removing step is again not specifically restricted, and may be selected as appropriate in accordance with the size or shape of the molded body, although it is preferably about 5–20 hours including the holding time of 1–5 hours and the warm-up time.

The nitriding step is for nitriding Si within the binder-removed body to obtain a molded body including $Si_3N_4$ (the nitrided body). In this step, almost all silicon within the binder-removed body is nitrided to form $Si_3N_4$. In the nitriding step, the binder-removed body is heated to 1350–1500° C. (preferably to 1380–1480° C.) in a nitrogen atmosphere for nitriding, to obtain the nitrided body. Since the melting point of Si is 1414° C., the nitriding is first conducted at a temperature below 1414° C. to nitride the surface layer, and the temperature is increased to exceed the melting point to 1415–1500° C. for further nitriding. If the temperature is lower than 1415° C., the reaction rate for nitriding is slow, which is impractical. If the temperature exceeds 1500° C., the $Si_3N_4$ particles generated by nitriding will cohere to each other by the heat to aggregate. If the nitriding step is not conducted, in the subsequent sintering step, Si will melt as the sintering temperature exceeds its melting point, so that the binder-removed body will lose its shape. As such, the nitriding step is not merely the step of nitriding the metal silicon, but is an important step for increasing the aspect ratio of the $Si_3N_4$ particles and for obtaining the sintered body formed of the $Si_3N_4$ particles of needle crystals.

When Si is nitrided almost 100% to form $Si_3N_4$, it becomes 1.66 times the weight of the Si binder-removed body, and at the same time, the volume of the $Si_3N_4$ increases by the nitriding and the porosity decreases. The obtained nitrided body is formed of globular $Si_3N_4$ particles of α-type crystals. At this time, when the binder-removed body has porosity of, e.g., 50%, the porosity will be decreased to 30% in the nitriding step.

Although the pressure of the nitrogen atmosphere during the nitriding step is not specifically restricted, it is preferably 3–10 atmospheres (0.3–1 MPa), and more preferably 4–7 atmospheres (0.4–0.7 MPa). If the nitriding step is conducted in the nitrogen atmosphere of less than 3 atmospheres, the reaction rate will be low, and non-nitrided Si will remain. If it is conducted in the nitrogen atmosphere of more than 10 atmospheres, while the reaction becomes fast, the cost required for the device will be too high, and operationality will also be degraded.

The period for the nitriding step is again not specifically restricted, and may be selected as appropriate in accordance with the size or shape of the binder-removed body, although it is preferably in a range of 2–10 hours from the standpoint of manufactural as well as economical efficiency.

The sintering step is the final step where the porosity and the average pore diameter of the obtained porous $Si_3N_4$ and also the aspect ratio of the $Si_3N_4$ particles constituting the porous $Si_3N_4$ are determined. In the sintering step, the nitrided body obtained in the above-described nitriding step is sintered at a temperature of 1750–1900° C., at a nitrogen pressure of 0.1–1 atmosphere (0.01–0.1 MPa). In the producing method of the porous $Si_3N_4$ according to the present invention, the low nitrogen pressure of 0.1–1 atmosphere (0.01–0.1 MPa) is employed for sintering to make $Si_3N_4$ aggressively decompose and re-precipitate, to thereby obtain thinner columnar crystals as well as higher porosity and higher aspect ratio. At the time of sintering, the sintering agent takes a liquid phase, and β-type $Si_3N_4$ grows from the $Si_3N_4$ dissolved in the liquid phase to form columnar crystals. Since the columnar crystals stop growing when they run against obstacles, a sintered body having a higher aspect ratio can be obtained with the nitrided body of higher porosity.

If the nitrogen pressure during the sintering step is less than 0.1 atmosphere, $Si_3N_4$ will vigorously decompose, and the amount of loss by volatilization will increase. If the nitrogen pressure exceeds 1 atmosphere, $Si_3N_4$ will be unlikely to decompose, so that the porosity will decrease. Within the above-described range of the nitrogen pressure, it is particularly preferable to conduct the sintering step at a nitrogen pressure of 0.1–0.5 atmosphere (0.01–0.05 MPa), in which case decomposition and re-precipitation of $Si_3N_4$ will advance favorably, so that a sintered body having higher porosity can be obtained.

In the producing method of the present invention, the sintering step is conducted at a temperature of 1750–1900° C. If the temperature is lower than 1750° C., the sintering will be insufficient, leading to low strength. If the temperature exceeds 1900° C., the aspect ratio will be low. Within the above-described temperature range, the sintering is preferably conducted at a temperature in a range of 1750–1850° C. for effective growth of thin columnar crystals and for a smaller average pore diameter.

Although the holding time in the sintering step is not specifically restricted, it is preferably 0.25–5 hours. If it is shorter than 0.25 hour, the sintering will be insufficient, resulting in poor strength. If it exceeds five hours, the sintering will advance excessively so that coarse particles will grow, with increased electricity expense.

Through the above-described steps, a porous $Si_3N_4$ having porosity of 30–60% with the columnar $Si_3N_4$ particles having a minor axis length of 0.2–5 μm and an aspect ratio of 2–20, ensuring uniformly high porosity from the surface to the inside of the sintered body, can be formed at a much lower cost than in the conventional case. Herein, the aspect ratio refers to a ratio of a major axis length to a minor axis length of the columnar particle. Generally, the higher the aspect ratio, the stronger the sintered body becomes. The aspect ratio of the $Si_3N_4$ particles can be determined as follows. The obtained sintered body (porous $Si_3N_4$) is processed with $HF—HNO_3$ mixture to dissolve the sintering agent, thereby obtaining loose $Si_3N_4$ particles. Each particle is then examined by a scanning electron microscope (SEM), for example, to measure width and length of the columnar particle. In the present invention, the $Si_3N_4$ columnar crystal is approximately hexagonal.

The present invention also provides a porous $Si_3N_4$ having Si powder and powder of at least one compound of a rare earth element as a first sintering agent as its starting materials, where the first sintering agent is added in an amount of 7.5–45 parts by mass, in terms of an oxide of the element, with respect to 100 parts by mass of the Si powder. This porous $Si_3N_4$ of the present invention is obtained by the above-described producing method of the present invention, and has excellent characteristics of porosity of 30–60%, with the columnar $Si_3N_4$ particles having a minor axis length of 0.2–5 μm and an aspect ratio of 2–20. The porous $Si_3N_4$ having such characteristics is preferable for the following reasons. If the porosity is less than 30%, the flow rate of the fluid may be insufficient. If the porosity exceeds 60%, the sintered body may be too poor in strength for practical application. However, since the penetrated amount of the liquid increases as the porosity increases, higher porosity within the above-described range is preferable from an economical point of view. If the minor axis length of the $Si_3N_4$ particles is shorter than 0.2 μm, they are so small that the strength may be insufficient. If it exceeds 5 μm, the particles tend to be globular, rather than columnar. If the aspect ratio of the $Si_3N_4$ particles is less than 2, the strength of the obtained porous $Si_3N_4$ will be insufficient. If the aspect ratio exceeds 20, forming thereof will be difficult.

The porous $Si_3N_4$ of the present invention is excellent in high-temperature resistance and chemical resistance, so that it is particularly suitable for use as a filter, such as a filter for removing foreign matters from within a corrosive liquid, a filter for use in a high temperature, and a catalyst carrier for use in a highly corrosive atmosphere. According to the porous $Si_3N_4$ of the present invention having the above-described configuration, a used filter can be reproduced by reverse flow of the liquid. This presumably is because the foreign matters accumulated on the columnar crystals have less entanglement with other portions, and thus, they can readily be removed therefrom.

The porous $Si_3N_4$ having Si powder and a compound of a rare earth element as its starting materials can be discriminated when the porous $Si_3N_4$ being the sintered body is crushed and the amounts of Si and the rare earth element contained therein are analyzed to confirm their presence. When the Si powder is used as the starting material, the Si content is greater than in the case where the $Si_3N_4$ powder is used as the starting material. When the $Si_3N_4$ powder is used as the starting material, the Si remaining amount is less than 50 ppm. When the Si powder is used as the starting material, the Si remaining amount is not less than 50 ppm. As such, the porous $Si_3N_4$ of the present invention can readily be discriminated.

Preferably, the porous $Si_3N_4$ of the present invention has its starting materials further including a second sintering agent being at least one compound selected from compounds of IIa group elements, IIIb group elements, IVb group elements and transition elements. The second sintering agent is preferably added in an amount of 0.05–5 parts by mass, in terms of an oxide of the element, with respect to 100 parts by mass of the Si powder.

Although the average pore diameter of the porous $Si_3N_4$ of the present invention is not specifically restricted, it is preferably 0.05–12 µm. The sintered body (porous $Si_3N_4$) having the average pore diameter of less than 0.05 µm tends to be technically difficult to produce. If the average pore diameter exceeds 12 µm, the effects as a filter aimed at by the present invention will be small. Such a fine average pore diameter can be obtained by using the metal Si particles having a particle diameter of at least 0.15 µm and less than 10 µm as the starting material and by performing sintering in a nitrogen atmosphere of a reduced pressure.

EXAMPLES 1–4, COMPARATIVE EXAMPLES 1–3

The effects of the nitrogen pressure at the time of sintering were examined. $Y_2O_3$ as the first sintering agent was added in an amount of 7.5 parts by mass with respect to 100 parts by mass of commercially available Si powder having an average particle diameter of 1 µm. The mixture was mixed using a ball mill for 15 hours, with ethanol as a solvent. The obtained slurry was dried naturally in the atmosphere. An organic binder (polyvinyl alcohol) for press molding was blended in an amount of 8 parts by mass with respect to 100 parts by mass of the dried powder. Next, a Si molded body of a circular plate shape having a diameter of 25 mm and a thickness of 3 mm was formed by press molding. The molded body thus formed was heated in a nitrogen atmosphere to 400° C. and held for two hours to remove the binder. The binder-removed body was heated to 1400° C. in a nitrogen atmosphere of 3 atmospheres (0.3 MPa), and held for five hours to obtain a nitrided body formed of $Si_3N_4$.

Further, the nitrided body was held at 1850° C. for two hours. With other conditions as shown in Table 1 below, the $Si_3N_4$ sintered bodies (porous $Si_3N_4$) as Examples 1–4 and Comparative Examples 1–3 were obtained. For each of the $Si_3N_4$ sintered bodies, the porosity and the average pore diameter were measured using a mercury porosimeter (Autoscan 60 porosimeter manufactured by Quanta Chrome). The sintered bodies were each dissolved with HF—HNO$_3$ mixture to obtain loose $Si_3N_4$ particles. Each $Si_3N_4$ particle was examined with a scanning electron microscope to obtain the aspect ratio. The results are shown in Table 1. Ceramics having the porosity of at least 30% can be obtained particularly when sintered at a nitrogen pressure of not greater than 1 atmosphere (0.1 MPa). The aspect ratio tends to increase as the nitrogen pressure increases.

TABLE 1

|  | Nitrogen pressure upon sintering | | Porosity | Average pore diameter | Minor axis length of columnar crystal | Aspect |
| --- | --- | --- | --- | --- | --- | --- |
|  | (Atmosphere) | (MPa) | (%) | (µm) | (µm) | ratio |
| Example 1 | 1 | 0.1 | 42 | 1.0 | 1.4 | 5 |
| Example 2 | 0.5 | 0.05 | 44 | 1.2 | 1.1 | 4 |
| Example 3 | 0.2 | 0.02 | 55 | 2.5 | 0.75 | 4 |
| Example 4 | 0.1 | 0.01 | 60 | 3.0 | 0.5 | 3.5 |
| Comparative Example 1 | 5 | 0.5 | 23 | 0.9 | 3.2 | 10 |
| Comparative Example 2 | 3 | 0.3 | 26 | 0.7 | 2.7 | 9 |
| Comparative Example 3 | 3 | 0.3 | 17 | 0.5 | 2.6 | 5 |

EXAMPLES 5–9

The effects of the added amount of a compound of a rare earth element as the first sintering agent were examined. For the respective examples, the materials as the first sintering agent were added in amounts as shown in Table 2 to commercially available Si powder having an average particle diameter of 1 µm, which were each mixed using a ball mill for 15 hours, with ethanol as a solvent. The obtained slurry was dried naturally in the atmosphere, and an organic binder (polyvinyl alcohol) for press molding was blended in an amount of 8 parts by mass with respect to 100 parts by mass of the dried powder. Thereafter, a molded body of Si of a circular plate shape having a diameter of 25 mm and a thickness of 3 mm was formed by press molding, which was then heated to 350° C. in a nitrogen atmosphere and held for five hours to remove the binder.

Next, the binder-removed body was heated to 1380° C. in a nitrogen atmosphere of 5 atmospheres (0.5 MPa) and held for seven hours to obtain a nitrided body. Further, the nitrided body was heated to 1835° C. in a nitrogen atmosphere of 0.5 atmosphere (0.05 MPa) and held for two hours for sintering. The $Si_3N_4$ sintered bodies (porous $Si_3N_4$) as Examples 5–9 were thus obtained. For each of the obtained $Si_3N_4$ sintered bodies, the porosity and the average pore diameter were measured with the mercury porosimeter in the same manner as in Examples 1–4. The results are shown in Table 2. It is possible to obtain the porosity of at least 30%, as in Examples 1–4, particularly because the sintering is conducted at a nitrogen pressure of 0.5 atmosphere (0.05 MPa). It is also seen from Table 2 that the aspect ratio of the $Si_3N_4$ particles in the sintered body increases in proportion to the added amount(s) of the compound(s) of the rare earth element(s). Among Examples 5–8, Example 8 having the highest porosity is most suitable for practical use.

TABLE 2

| | First sintering agent and its added amount (parts by mass) | Porosity (%) | Average pore diameter (μm) | Minor axis length of columnar crystal (μm) | Aspect ratio |
|---|---|---|---|---|---|
| Example 5 | Y$_2$O$_3$: 20 | 48 | 1.1 | 1.2 | 3 |
| Example 6 | Y$_2$O$_3$: 30 | 45 | 0.9 | 1.5 | 6 |
| Example 7 | Y$_2$O$_3$: 45 | 42 | 0.8 | 1.6 | 8 |
| Example 8 | (Y$_2$O$_3$: 5) + (Yb$_2$O$_3$: 7.5) | 50 | 1.3 | 1.7 | 15 |
| Example 9 | (Y$_2$O$_3$: 10) + (Yb$_2$O$_3$: 15) | 36 | 0.3 | 1.8 | 18 |

EXAMPLES 10–15

The effects of adding the first and second sintering agents at the same time were examined. Commercially available Si powder having an average particle diameter of 0.15 μm was added with the first and second sintering agents. For the respective examples, Y$_2$O$_3$ as the first sintering agent was added to the Si powder in an amount of 25 parts by mass. The materials as the second sintering agent were also added to the Si powder in respective amounts as shown in Table 3. They were each mixed for 20 hours with ethanol as a solvent. The obtained slurry was dried naturally in the atmosphere, and an organic binder (polyvinyl alcohol) for press molding was added 8 parts by mass with respect to 100 parts by mass of the dried powder. Thereafter, a Si molded body of a circular plate shape having a diameter of 25 mm and a thickness of 3 mm was formed by press molding, which was heated to 450° C. in a nitrogen atmosphere and held for four hours to remove the binder. It was then heated to 1400° C. in a nitrogen atmosphere of 3 atmospheres, and held for five hours to obtain a nitrided body.

Further, the nitrided body was sintered at a nitrogen pressure of 0.3 atmosphere (0.03 MPa). The holding time for sintering was two hours. The temperature for sintering was as shown in Table 3. For each of the obtained Si$_3$N$_4$ sintered bodies, the porosity and the average pore diameter were measured with the mercury porosimeter. The results are shown in Table 3. It is found that, even if the added amount of the second sintering agent is small, the amount of liquid phase increases, and the temperature for generation of the liquid phase decreases, so that the growth of the Si$_3$N$_4$ particles is suppressed. As a result, the sintered body has a fine average pore diameter, although the porosity decreases. Among Examples 10–15, Examples 11 and 13 provide favorable filters having high porosity.

EXAMPLES 16–20

Samples were formed by changing the porosity of the binder-removed body, obtained by removing the binder from the molded body, and also changing the nitrogen pressure at the time of sintering. Commercially available Si powder having an average particle diameter of 9 μm was added with Y$_2$O$_3$ as the first sintering agent in an amount of 15 parts by mass, which was mixed for 0.5 hour with ethanol as a solvent. The obtained slurry was dried naturally in the atmosphere, and an organic binder (polyvinyl alcohol) for press molding was blended 8 parts by mass with respect to 100 parts by mass of the dried powder. Thereafter, a molded body of Si of a circular plate shape having a diameter of 25 mm and a thickness of 3 mm was formed by press molding, which was heated to 400° C. in a nitrogen atmosphere and held for three hours to remove the binder. The respective binder-removed bodies have the porosity as shown in Table 4. Thereafter, they were heated to 1450° C. in a nitrogen atmosphere of 5 atmospheres, and held for three hours to obtain nitrided bodies.

Further, the nitrided bodies were held at 1835° C. for 3.5 hours, and sintered to obtain Si$_3$N$_4$ sintered bodies (porous Si$_3$N$_4$) as Examples 16–20. Other conditions for the sintering are shown in Table 4. For each of the obtained Si$_3$N$_4$ sintered bodies, the porosity and the average pore diameter were measured with the mercury porosimeter in the same manner as in Examples 1–4. It was possible to obtain porous bodies having large average pore diameters, since the raw materials used had large particle diameters. It is found that the porosity of the porous Si$_3$N$_4$ shows greater dependency on the nitrogen pressure at the time of sintering than on the porosity of the binder-removed body. Among Examples 16–20, Example 19 is most favorable with the highest porosity.

TABLE 3

| Sample | Sintering temperature (° C.) | Second sintering agent and its added amount (parts by mass) | Porosity (%) | Average pore diameter (μm) | Minor axis length of columnar crystal (μm) | Aspect ratio |
|---|---|---|---|---|---|---|
| Example 10 | 1780 | SiO$_2$: 0.1 | 33 | 0.15 | 0.5 | 2.5 |
| Example 11 | 1750 | MgO: 0.1 | 35 | 0.05 | 0.2 | 1.5 |
| Example 12 | 1750 | MgO: 4.5 | 31 | 0.1 | 0.2 | 2 |
| Example 13 | 1770 | Al$_2$O$_3$: 0.1 | 36 | 0.3 | 0.4 | 4 |
| Example 14 | 1770 | Al$_2$O$_3$: 0.5 | 31 | 0.2 | 0.4 | 3.5 |
| Example 15 | 1770 | (TiO$_2$: 0.2) + (MgO: 0.1) | 32 | 0.1 | 0.4 | 2.5 |

TABLE 4

|  | Porosity of binder removed body (%) | Nitrogen pressure upon sintering | | Porosity (%) | Average pore diameter (µm) | Minor axis length of columnar crystal (µm) | Aspect ratio |
| --- | --- | --- | --- | --- | --- | --- | --- |
|  |  | (Atmosphere) | (MPa) |  |  |  |  |
| Example 16 | 51 | 1 | 0.1 | 48 | 3.1 | 4.5 | 7 |
| Example 17 | 43 | 1 | 0.1 | 41 | 2.4 | 4.2 | 6 |
| Example 18 | 55 | 1 | 0.1 | 52 | 3.5 | 4.8 | 8 |
| Example 19 | 51 | 0.2 | 0.02 | 58 | 5.5 | 3.6 | 6 |
| Example 20 | 42 | 0.2 | 0.02 | 54 | 4.5 | 3.2 | 6 |

As described above, according to the producing method of porous $Si_3N_4$ of the present invention, Si powder and a compound of a rare earth element, instead of $Si_3N_4$, are used as its starting materials, so that the raw material cost is decreased. As such, it is possible to obtain a porous $Si_3N_4$ suitable for use as a filter at a low cost. Further, the step of sintering is conducted at a temperature of 1750–1900° C. in a nitrogen atmosphere of a low pressure of 0.1–1 atmosphere, so that $Si_3N_4$ is decomposed and re-precipitated during the sintering. As such, the porosity of the porous $Si_3N_4$ can be maintained high, and the aspect ratio of the $Si_3N_4$ particles can also be maintained high. The porous $Si_3N_4$ of the present invention is excellent in high-temperature resistance and chemical resistance, so that it is useful for a filter for removing foreign matters from a corrosive liquid, for a filter for use in a high temperature, and for a catalyst carrier for use in a highly corrosive atmosphere.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A producing method of a porous $Si_3N_4$, comprising the steps of:
    (a) mixing, as a first sintering agent, powder of at least one compound of a rare earth element in an amount of 7.5–45 parts by mass in terms of an oxide of the element with respect to 100 parts by mass of Si powder to obtain mixed powder;
    (b) adding a binder to the mixed powder;
    (c) molding the mixture of the mixed powder and the binder into a molded body;
    (d) heating the molded body in a nitrogen atmosphere to 300–500° C. to remove the binder therefrom to form a binder-removed body;
    (e) nitriding the binder-removed body by heating the same in a nitrogen atmosphere to 1350–1500° C. to form a nitrided body including $Si_3N_4$; and
    (f) sintering the nitrided body at 1750–1900° C. at a nitrogen pressure of 0.1–0.5 atmosphere to make $Si_3N_4$ decompose and re-precipitate, to thereby obtain thinner columnar crystals of $Si_3N_4$.

2. The producing method of a porous $Si_3N_4$ according to claim 1, wherein said mixing step includes the step of further mixing, as a second sintering agent, powder of at least one compound selected from compounds of IIa group elements, IIIb group elements, IVb group elements and transition elements in an amount of 0.05–5 parts by mass in terms of an oxide of the element with respect to 100 parts by mass of the Si powder.

3. The producing method of a porous $Si_3N_4$ according to claim 1, wherein said nitriding step is conducted in the nitrogen atmosphere of 3–10 atmospheres.

* * * * *